Figure 1:
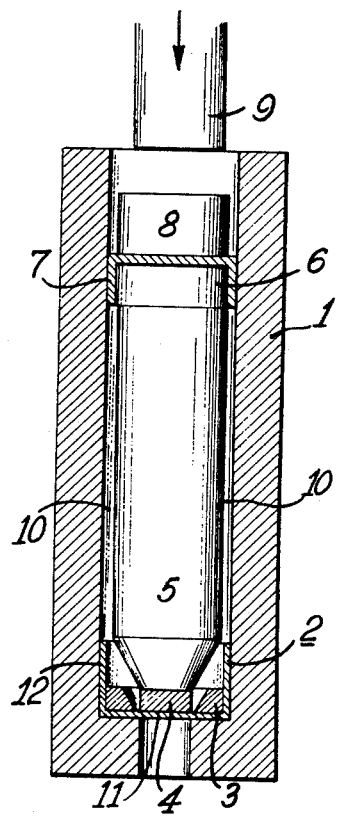

Jan. 8, 1963  C. SAUVE  3,072,251
PROCESS AND DEVICE FOR EXTRUSION
Filed Jan. 25, 1960  2 Sheets-Sheet 1

Jan. 8, 1963    C. SAUVE    3,072,251
PROCESS AND DEVICE FOR EXTRUSION
Filed Jan. 25, 1960

United States Patent Office 3,072,251
Patented Jan. 8, 1963

3,072,251
PROCESS AND DEVICE FOR EXTRUSION
Charles Sauve, Versailles, France, assignor to Commissariat A L'Energie Atomique, Paris, France
Filed Jan. 25, 1960, Ser. No. 4,575
Claims priority, application France Jan. 27, 1959
10 Claims. (Cl. 207—10)

The present invention is concerned with an extrusion process, more particularly a metal extrusion process, and with apparatus for carrying out the process. The invention more particularly relates to an improvement in an extrusion process which consists in placing a billet in a container provided with a die and applying sufficient pressure for the material of which the billet is made to undergo plastic deformation and pass through the die.

This method of extrusion is usually carried out under hot conditions in order to facilitate plastic deformation of the material to be extruded. It is also known that one of the difficult problems which arise, above all when extruding metals, is that of lubricating the walls of the container and the die, against both of which the material to be extruded is brought to bear with considerable force. The material must, in fact, be prevented from sticking to these walls, both in order to avoid wear on the appliance and to provide a steady plastic flow, a condition which is required for industrial work and in order to obtain sound extruded pieces having a suitable surface condition.

Various methods of lubrication have hitherto been used, but they are not satisfactory in all cases; some of them require somewhat complicated and vulnerable methods, such for example as that which consists in injecting the lubricant under pressure between the billet and the container during extrusion. Coating the walls of the container with a lubricant before the operation is generally insufficient. One method consists in placing a quantity of grease at the bottom of the container, the lubricant being pushed by the billet itself into the space between the latter and the container; in direct extrusion, in which the die is, in fact, disposed at the bottom of the container, this method is unsatisfactory, since most of the lubricant is forced out of the container through the die as soon as the extrusion operation starts. An attempt has been made to solve the problem by using viscous lubricating compositions which occur in the solid state at room temperature; such a composition, generally in the form of a pad, is placed on the die inside the container; this process is fairly effective but only with dies having a plane front face, whilst it does not contribute any improvement when a die having a flared, for example conical, inlet is used, as is becoming increasingly the usual practice.

It is accordingly an object of the present invention to improve lubrication in all cases of extrusion where it is necessary, and consequently to improve the quality of the extruded pieces and make the work of extrusion easier.

The process according to the invention consists essentially in closing the outlet of the extrusion container, before the extrusion operation, with at least one closure member which has a greater resistance to breakage than the pressure required to distribute the lubricant employed over the whole area to be lubricated inside the container.

In carrying out the process according to the invention, the container incorporating the extrusion die is closed with the closure member, the billet to be extruded and the lubricant are placed therein, with the lubricant disposed between the die and the billet, and pressure is then exerted on the billet. This pressure first of all compresses the lubricant and pushes it into the space between the billet and the walls of the container; the closure member prevents the lubricant from being ejected and the lubricant is evenly distributed over the surface of the billet. The pressure then brings the billet into contact with the die and causes extrusion to start; after the closure member has broken, the lubricant disposed in the annular space between the container and the billet can be discharged only in the form of a film on the surface of the extruded product.

The pressure $p$ required to distribute the lubricant may be measured once and for all for a lubricant of given viscosity in conjunction with a container and billet of given nature and dimensions, at a specified working temperature; this enables a choice to be made of a suitable closure member which will break at a pressure greater than $p$. It is preferred to employ a closure member which will break at a pressure at least 10% to 30% greater than $p$.

According to a particular feature of the invention, the need for measuring the required pressure $p$ may be eliminated by employing a plug or a closure member having a resistance to breakage R slightly lower than or equal to the pressure P required to effect extrusion of the billet at the extrusion temperature. It is particularly advisable to use a closure member having a resistance to breakage which is between 50% and 95% of P; it will then be certain that in substantially all cases the lubricant will be forced into all those parts which have to be lubricated well before the billet begins to be extruded.

In general, it is preferred to employ a plug or closure member whose resistance to breakage R is between $1.1p$ and $0.95P$; or, in order to simplify the choice of closure member, in which R is between $0.50P$ and $0.95P$.

In extruding various common metals, the extrusion pressure P required ranges from 2 to 50 kg./mm.$^2$; if practical values on the order of 0.25 to 2.50 kg./mm.$^2$ are assumed for $p$, it will be seen that according to circumstances the extreme values of R may range from about 0.25 to 50 kg./mm.$^2$; this implies that the closure member employed according to the invention can have a wide range of thickness (actually from 0.01 mm. to 15 mm.) according to the nature of the closure member.

The simplest shape that the closure member can have is that of a plate adapted to be disposed against the outlet of the container. According to the shape of the outlet of the container or of the die, the closure member may have a cross-section other than that of a simple parallel-faced plate; it may, in particular, be conical, frusto-conical, hemispherical, etc., in order to fit the outlet aperture of the container or the die. Moreover, it may be advantageous to have closure members with turned-up edges, in order to provide a better fluid-tight seal.

The material of which the closure member is made will depend on the conditions of pressure and temperature under which extrusion is carried out.

Thus, for example, when working at room temperature or slightly elevated temperatures, a plastic material may be used, such as polyamide, polyvinyl chloride, polyolefine, cellulose or cellulose ester, polyester, phenol formaldehyde resin etc., or even a soft metal, such as lead, tin, aluminum etc.

On the other hand, when extrusion is carried out at a fairly high temperature and at high pressures—as in the case of drawing metals such as copper, brass, magnesium, steel, bronze etc.—the closure member is preferably made of a fairly resistant metal, such for example as steel, bronze, brass, copper, or aluminum alloy.

It is to be clearly understood that the thickness of a closure member of given shape which has to withstand a definite pressure R, will depend directly upon the nature of the material used. This thickness may be calculated by known methods starting from the mechanical properties of the material. By way of example, it may be stated that in the case of extrusion carried out at moderate temperature, a closure member made of extra-soft steel 0.5 mm. thick could be replaced by one made of one of the following materials, the approximate thickness being as indicated in each case: 0.10 mm. of copper, 0.125 mm. of brass, 0.065 mm. of gun-metal, 0.18 mm. of aluminium, 0.03 mm. of aluminium-bronze, 0.11 mm. of rolled zinc, 1.6 mm. of common lead, 0.7 mm. of hardened lead (containing Sb), 0.025 mm. of nickel-chrome steel, 0.275 mm. of polyamide (nylon), or 0.4 mm. of phenol formaldehyde (Bakelite).

It is also to be clearly understood that for each particular case of extrusion, the material chosen for the closure member will be one which does not melt at the temperature at which extrusion is carried out.

It is clear that the effective thickness of the closure member must be adapted to each particular extrusion operation; it therefore varies within wide limits according to the nature of the billet to be extruded, the viscosity of the lubricant, the shape and dimensions of the container and the die, and with the extrusion temperature and pressure. However, in the extrusion of most common metals, a suitable thickness of extra-soft steel is generally from 0.01 mm. to 0.5 mm., and is most frequently from 0.02 mm. to 0.2 mm.

The process according to the invention may be carried out with any suitable lubricants which liquefy when hot, more particularly with oils, greases, metallic soaps, (such as the stereates of Al, Zn, Mg etc.), compositions of fatty substances with graphite or molybdenum sulphide. These lubricants can be introduced into the container in their usual forms, that is to say as liquids, pastes, powders or pads.

The lubricant can consist, for example, of a metallic soap, either alone or in admixture with a grease, of a mixture of extra fine graphite and paraffin, or of any other suitable mixture which is solid at room temperature and is liquefied on heating. A particularly suitable lubricant is a mixture of the graphite having a very small particle size known as "colloidal" graphite and an organic resin.

As indicated above, it is increasingly preferred to carry out extrusion with a die having a flared inlet and where such a die is employed in the process or device of the present invention, it is preferred that the downstream end of the billet should be given a form adapted to fit the flared portion of the die. In this case, it is preferred to place a pad of lubricant in the flared portion of the die so that during the extrusion operation, the lubricant is first crushed by the billet and then forced outwardly towards the periphery of the latter, while said end of the billet penetrates into the die.

The number and the placing of the closure members employed will depend upon the particular configuration of the extrusion device used. The closure member can be placed between the die and the bottom of the container, or on the face of the die, or even, if desired, in both these places at the same time. In direct extrusion it is often useful to place a second closure member upsteam of the billet, for example, between the latter and the dummy block liner, or between two liners or pressure plates; the escape of lubricant past the billet thus being prevented.

In the case of reverse extrusion, there is no outlet orifice at the bottom of the container and the possibility of placing a closure member there does not arise, but it can be useful to place one against one of other of the faces of the die.

The present invention also comprises an extrusion device comprising at least one container having at least one aperture and a die which, in itself, may be of any desired type and which is characterised, according to the present invention, in that the aperture through which the extruded material is intended to emerge is closed with a closure member having a resistance to breakage, at the desired extrusion temperature, which is greater than the pressure required to distribute the lubricant employed throughout the space between the container and the billet to be extruded, and not greater than the extrusion pressure to be applied to the billet.

Figure 2:
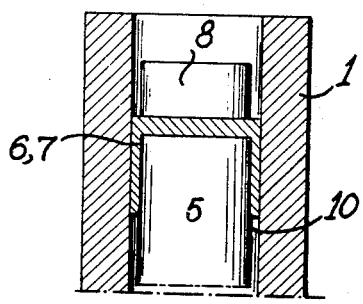
Figure 3:
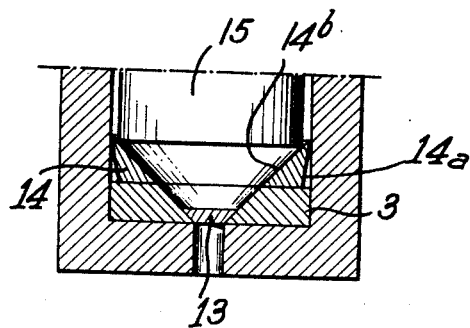
Figure 4:
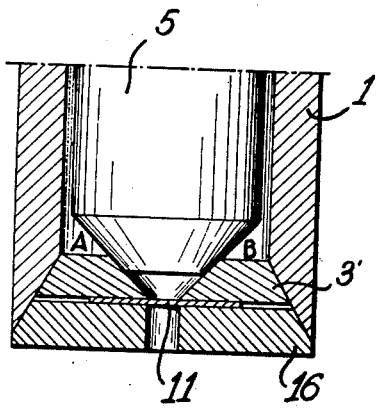

In order that the invention may be more fully understood, certain embodiments thereof will now be described, by way of example only, with reference to the accompanying drawing in which FIGURE 1 is a diagrammatic longitudinal section through an extruding tool provided with two closure members, FIGURE 2 is a detail view, showing a variant in the structure of the closure member placed at the same level as the pressure plates, FIGURE 3 is a longitudinal axial section through the downstream portion of another tool including a closure member of a different type from that shown in FIGURE 1, and FIGURE 4 is a diagrammatic illustration of a variant in the apparatus illustrated in FIGURE 1.

The extrusion tool shown in FIGURE 1 comprises a container 1 having an apertured base which is closed by means of a first cylindrical closure member or capsule 2; the upturned edge or rim of the capsule 2 provides a fluid-tight seal between the periphery of a die 3 which lies within the capsule 2 and the walls of the container 1. Placed within the container is a billet 5 whose downstream end is of special frusto-conical shape adapted to enter the flare of the die 3. The tool is also provided with two pressure plates or liners 6 and 8 resting on the upstream end of the billet 5 and a second closure member 7, similar to the capsule 2, is located between the liners 6 and 8. A solid pad of lubricant 4 is placed in the flared inlet of the die 3.

In extruding the billet 5, the ram 9 of a press pushes the liners 6 and 8 and the billet 5, downwards. During the first phase of compression, before the billet starts to undergo plastic deformation, its frusto-conical end crushes the lubricant 4, which is, at this instant, in the solid or a more or less viscous liquid state, according to the temperature at which the operation is being carried out. The presence of the capsule 2 prevents the lubricant from passing through the die opening, while at the same time, the frusto-conical shape of the end of the billet 5 prevents the lubricant from remaining in the flare of the die, it is therefore, forced to enter the space 10 between the billet 5 and the internal wall of the container 1.

The second closure member 7 prevents the lubricant which has been thus forced back from passing through the upstream aperture of the container 1, that is to say past the sides of the pressure plates 6 and 8.

The material of which the closure members 2 and 7 are made and their thickness, are so chosen that they only undergo a very considerable degree of deformation at a pressure appreciably higher than that required to force the lubricant into the whole of the space 10. Consequently, breakage or extrusion of the capsule 2 occurs slightly before, or during, the beginning of plastic deformation of the billet 5; following which the die opening becomes free for the extruded material of the billet 5 to pass. The lubricant, having been trapped in the space 10, is extruded with the billet and uniformly lubricates the die opening and the walls of the container during the whole extrusion operation.

It is evident that the air imprisoned in space 10 cannot hinder lubrication because the air is extremely compressible while the lubricant even if it is a liquid, is practically incompressible. Extrusion takes place at elevated pressures, for example on the order of one thousand (1,000) kilograms per square centimeter, so that the volume of the air is reduced to $\frac{1}{1000}$ of its initial value. Further, capillary action causes the lubricant to penetrate into the spaces containing the compressed gas.

In an alternative embodiment, the closure member or capsule 2 is reduced to a simple plate 11, independent of the upturned edge or rim portion 12, the latter forming a permanent lateral packing.

In the embodiment illustrated in FIGURE 2, a single-unit piece 6—7, which acts both as a pressure plate and a closure member on the upstream side, is used instead of the two elements illustrated in FIGURE 1, while the pressure plate 8 is identical with that shown in FIGURE 1.

An alternative form of closure member on the downstream side is shown in FIGURE 3; it consists of a piece 13 of the same shape as the flare of the die; this variant is therefore particularly applicable to flared dies. The piece 13 can, in other variants, also comprise a flat portion to cover the whole front face of the die, and such a flat portion can also comprise an upturned edge or rim like that of the capsule 2 shown in FIGURE 1.

The die 3 is surmounted by a fluid-tight sealing collar 14 having conical lateral faces 14a and 14b (the external face 14a being less conical and losing its conical shape when brought to bear against the walls of the container); this arrangement enables an ordinary flat-ended billet 15 to be extruded.

In the embodiment shown in FIGURE 4, a billet 5 is brought to bear in known manner against the die 3' which is of double-cone type (internal conical shape and external conical shape) and which may thus be brought to bear against the container 1 with a force considerably greater than the extrusion force on the front surface AB of the die. The problem of obtaining a permanent fluid-tight seal between the die 3 and the container 1 may be solved as described in connection with FIGURES 1 to 3; the closure member on the downstream side is placed between the die 3' and an apertured element 16 and takes the form of a plate 11.

When the process according to the invention is used in extruding copper at between 800° and 900° C., use may be made, for example, of copper closure members 0.5 to 1 mm. thick, or extra-soft steel closure members about 0.2 to 0.4 mm. thick. To extrude brass at about 700° C. and at about 25 kg./mm.², the closure members may also be made of brass (for example 0.3 mm. to 0.6 mm. thick), or of copper. The extrusion of phosphor-bronze, silicon-bronze or lead-bronze, which is done at about 800° to 900° C., requires fairly high pressures and good lubrication may be provided by using closure members of various thicknesses and made, for example, of bronze, copper, soft steel or extra-soft steel.

In extruding magnesium at about 300° to 500° C., and in particular alloys of Mg comprising 1.5% Mn or 8.5% Al and 0.5% Zn, closure members a few tenths of a millimetre thick may be used and may, for example, be made of these alloys themselves, of aluminium alloys, of iron or of steel.

The extrusion of zinc and its alloys, in particular the common alloy comprising 4% Al and 0.04% Mg, which is generally carried out at from 250° to 300° C., may be carried out with brass closure members about 0.3 to 0.6 mm. thick.

In general, the greater the viscosity of the lubricant, that is to say the greater the pressure $p$ required to distribute the latter, the more necessary is it to use closure members having a high breakage pressure R; this implies either greater thickness or a material of higher tensile strength.

When relatively thin closure members, for example less than 0.5 mm. thick, are used, they may be placed between the die and the outlet of the container, as is the capsule 2 in FIGURE 1; if thicker closure members, for example of the order of 2.5 mm. thick, are used, it is preferred to locate them in the manner shown in FIGURE 3, that is to say in the flare of the die.

What is claimed is:
1. An extrusion process in which a billet of the material to be extruded and a lubricant are placed in a container provided with a die, and pressure is applied to the billet to cause it to be plastically deformed and the material thereof to pass through the die, characterised in that the aperture in the container through which the extruded material is intended to emerge is closed, before pressure is applied, with a closure member, the lubricant being placed between the billet and the closure member, the closure member having a resistance to breakage, at the extrusion temperature, which is greater than the pressure required to distribute the lubricant throughout the space between the container and the billet, and is not more than the extrusion pressure applied to the billet.

2. A process according to claim 1, in which the resistance to breakage of the closure member, at the extrusion temperature, exceeds the pressure required to distribute the lubricant, by at least 10%.

3. A process according to claim 1, in which the resistance to breakage of the closure member at the extrusion temperature is 50% to 95% of the extrusion pressure.

4. A process according to claim 1, in which extrusion is carried out in a container having two apertures, the aperture opposite to the outlet for the extruded material being closed by a fluid-tight closure member.

5. An extrusion device comprising at least one container having at least one outlet aperture, a die and a billet to be extruded in the container, a closure member for said aperture, extrusion lubricant adjacent said die and said closure member, said closure member and said die being adjacent said outlet aperture of the container, and having a resistance to breakage, at extrusion temperature, which is greater than the pressure required to distribute said extrusion lubricant throughout the space between the container and the billet, and is not more than the extrusion pressure applied to the billet.

6. A device according to claim 5, in which the closure member is placed between the die and the outlet aperture of the container.

7. A device according to claim 5, in which the inlet of the die is flared towards the face of the die and the closure member is placed in the flared portion of the die.

8. A device according to claim 6, in which the closure member takes the form of a capsule having a turned-up edge or rim which is adapted to make fluid-tight contact with the lateral walls of the container.

9. A device according to claim 6, in which the inlet of the die is flared to fit the downstream end of the billet to be extruded.

10. A device according to claim 5, in which said closure member is 0.01 mm. to 15 mm. thick.

References Cited in the file of this patent

UNITED STATES PATENTS

| | | |
|---|---|---|
| 670,611 | Hoffman | Mar. 26, 1901 |
| 796,970 | Hoopes | Aug. 8, 1905 |
| 1,840,472 | Singer | Jan. 12, 1932 |
| 2,415,696 | Klocke | Feb. 11, 1947 |
| 2,630,623 | Chisholm et al. | Mar. 10, 1953 |
| 2,806,596 | Dodds et al. | Sept. 17, 1957 |
| 2,893,555 | Buffet et al. | July 7, 1959 |
| 2,907,454 | Sejournet | Oct. 6, 1959 |

FOREIGN PATENTS

| | | |
|---|---|---|
| 476,693 | Canada | Sept. 11, 1951 |
| 405,637 | Great Britain | Feb. 5, 1934 |
| 689,051 | Great Britain | Mar. 18, 1953 |
| 739,499 | Great Britain | Nov. 2, 1955 |